(12) United States Patent
Hwang

(10) Patent No.: US 6,665,397 B1
(45) Date of Patent: Dec. 16, 2003

(54) TELEPHONE SIGNAL DETECTING CIRCUIT

(75) Inventor: Bar-Chung Hwang, Taoyuan (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/323,173

(22) Filed: May 27, 1999

(30) Foreign Application Priority Data

May 28, 1998 (TW) .................................... 87108364 A

(51) Int. Cl.⁷ .............................................. H04M 1/57
(52) U.S. Cl. ............................... 379/373.01; 379/382
(58) Field of Search ............................. 379/373.01, 382

(56) References Cited

U.S. PATENT DOCUMENTS

| | | | | |
|---|---|---|---|---|
| 4,199,659 A | * | 4/1980 | Lischin ....................... | 379/143 |
| 4,484,036 A | * | 11/1984 | Lyle et al. .................. | 379/351 |
| 4,720,853 A | * | 1/1988 | Szlam ........................ | 379/382 |
| 5,987,120 A | * | 11/1999 | Hwang et al. .............. | 379/372 |

OTHER PUBLICATIONS

Philips Semiconductor, Data Sheet 74F379A Quad Register, Mar. 12, 1996, p. 3.*

* cited by examiner

Primary Examiner—Forester W. Isen
Assistant Examiner—Daniel Swerdlow
(74) Attorney, Agent, or Firm—Ladas & Parry

(57) ABSTRACT

A telephone signal detecting circuit is provided, which can identify an input signal is a line reversal signal or a ring signal. Providing this telephone signal detecting circuit into a ring detector of a conventional telephone set can share the burden of the microprocessor of the telephone set and lessen the loading of power supply. In this invention, the Schmitt triggers of two different trigger levels are used to respectively detect the voltage change of the first discharge of the capacitor and the ripple signal produced due to the charge of the capacitor by the ring signal. The input signal can be easily identified to be a line reversal signal or a ring signal through a simple flip-flop circuit that can reduce the influence of the bouncing effect. The telephone signal detecting circuit is operated in a static mode and is almost free of power-consumption when it is not working.

12 Claims, 5 Drawing Sheets

TELEPHONE SIGNAL DETECTING CIRCUIT

BACKGROUND OF THE INVENTION

1. Field of the Invention

This invention relates to a telephone signal detecting circuit, which can distinguish a line reversal signal and a ring signal.

2. Description of Prior Art

A telephone system is either on-hook or off-hook. When a telephone system is on-hook, there are different signaling sequences to interrupt such state for different standards. Referring to FIG. 1, which illustrates the timing diagram of Caller ID signals. FIG. 1a represents the timing of Caller ID for BT's (British Telecom) standard. That is, a Caller ID signal is sent to the telephone system before a ring signal. However, the telephone system stays in a standby state, which is very low-power consumption when it is on-hook. Therefore a line reversal signal is used to wake up the microprocessor of the telephone system before the arrival of the Caller ID signal. FIG. 1b shows the Bellcore's standard, caller ID signal is arrived after the first ringing. However, the caller ID signal is not to be received when the line reversal signal appears. A telephone set, which can identify the calling party, normally determines whether a received signal is a line reversal signal or a ring signal according to the period of interrupting the microprocessor of the telephone set, and then determines whether to activate the caller identifying IC. Another simple method is to activate the IC no matter whether the microprocessor is interrupted by a line reversal signal or a ring signal. After passing a period of time, the caller identifying IC is turned off if no caller ID signal is received. However, the power is wasted no matter which method is adopted. Moreover, the first method also wastes the time of the microprocessor in the telephone set.

FIG. 2 shows a diagram for the detection circuit for the line reversal signal or the ring signal in a normal telephone set. In FIG. 2 there are only illustrated a rectifier circuit 10 and a ring detector 20 since it is used to explain the detection for the signal input of the telephone set. In the rectifier circuit 10, the capacitors C1, C2 can block the DC voltage in the tip/ring line. The AC signal can be obtained by the resistor R1 and capacitor C1 or the resistor R2 and the capacitor C2 and then rectified by the rectifier consisting of D1, D2, D3 and D4. The rectified signal is input to the ring detector 20. A part of the signal is sent to the input terminal RNGDI (ring detector input) of the Schmitt trigger 201 through the resistors R3 and R4. Therefore, if the change of the signal in the tip/ring line is large enough, Q1 will discharge the capacitor C3, and the output terminal RNGON becomes low level. When the signal in the tip/ring line is stable, Q1 will not discharge the capacitor C3. The capacitor C3 is then charged by $V_{CC}$ through the resistor R5, and the output terminal RNGON becomes high level. FIG. 3 illustrates a diagram of the waveform for the signal on RNGRC and RNGON while inputting the line reversal signal or the ring signal. The output terminal RNGON is low level when the voltage of RNGRC drops off. Normally speaking, it can be identified whether there is a line reversal signal or a ring signal in accordance with the voltage level of the output terminal RNGON.

However, a bouncing phenomenon often occurs when the exchange activates a line reversal signal or a ring signal, therefore the transistor Q1 is in a status of "on, off, on, off" at the beginning of discharging the capacitor C3, as shown in FIG. 4. A series of rising and falling of the signal similar to a ripple causes the error of signal detection.

SUMMARY OF THE INVENTION

The object of this invention is to provide a telephone signal detecting circuit, which can identify an input signal as a line reversal signal or a ring signal before the end of the detection for the line reversal signal or the ring signal.

The telephone signal detection according to this invention is to latch the identifying signal before the end of the detection for the line reversal signal or the ring signal and interrupt the microprocessor. The microprocessor recognizes whether the input signal is a line reversal signal or a ring signal according to the identifying signal. Then the interrupt signal is clear, and the microprocessor can go on to the next task.

In addition, the design of the circuit of this invention uses Schmitt triggers of different trigger levels, wherein the Schmitt triggers having a higher trigger level are used to detect the input line reversal signal and ring signal, the Schmitt triggers having a lower trigger level are used to detect the ripple signals of the capacitor while detecting the ringing, and accordingly determine the ring signal. The ripple detecting circuit can overcome the signal detecting error caused by the bouncing effect occurred when the exchange activates the line reversal signal and the ring signal.

The telephone signal detecting circuit of this invention includes Schmitt triggers of two different trigger levels, which are a first level and a second level. As the capacitor is charged and discharged, the trigger having the first trigger level outputs a ring detecting signal when the voltage of the capacitor is lower than the first level, and the trigger having the second trigger level outputs a pulse signal corresponding to the ripple signal when the voltage of the capacitor is lower than the second trigger level. Furthermore, the ripple detecting circuit can filter out the bouncing noise by the driving of the trigger having the first trigger level and under the control of the trigger having the second trigger level, and outputs a ring signal after receiving the pulse signal. Thus the input signal is determined to be a line reversal signal when the ring detecting signal is low level and no ripple signal outputs. Otherwise the input signal is determined to be a ring signal if the ring detecting signal is low level and a ripple signal is output.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

Figure 1A:
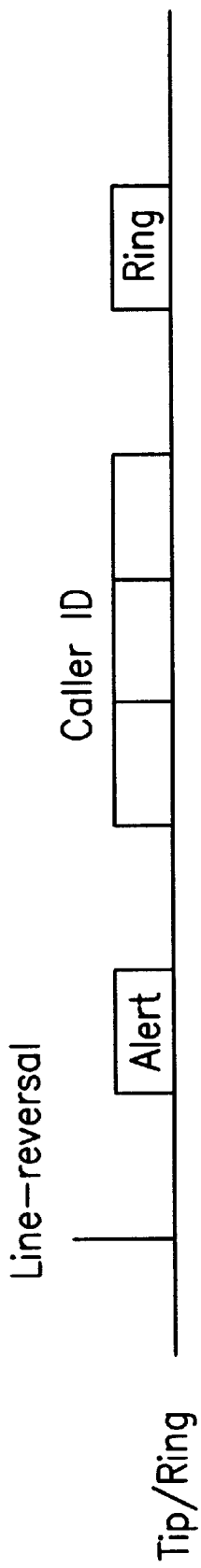
FIG. 1 is a timing diagram of call ID signal in a communication standard.
Figure 1B:
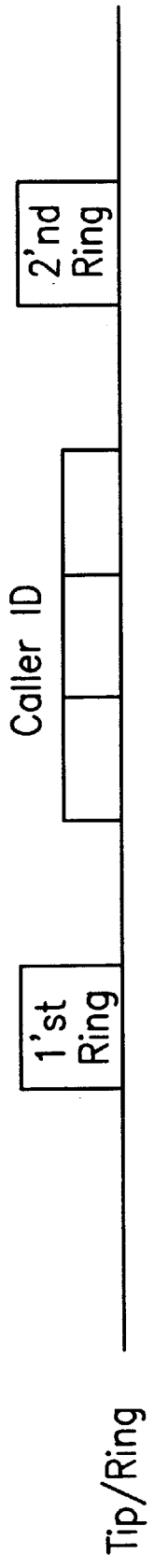
Figure 2:
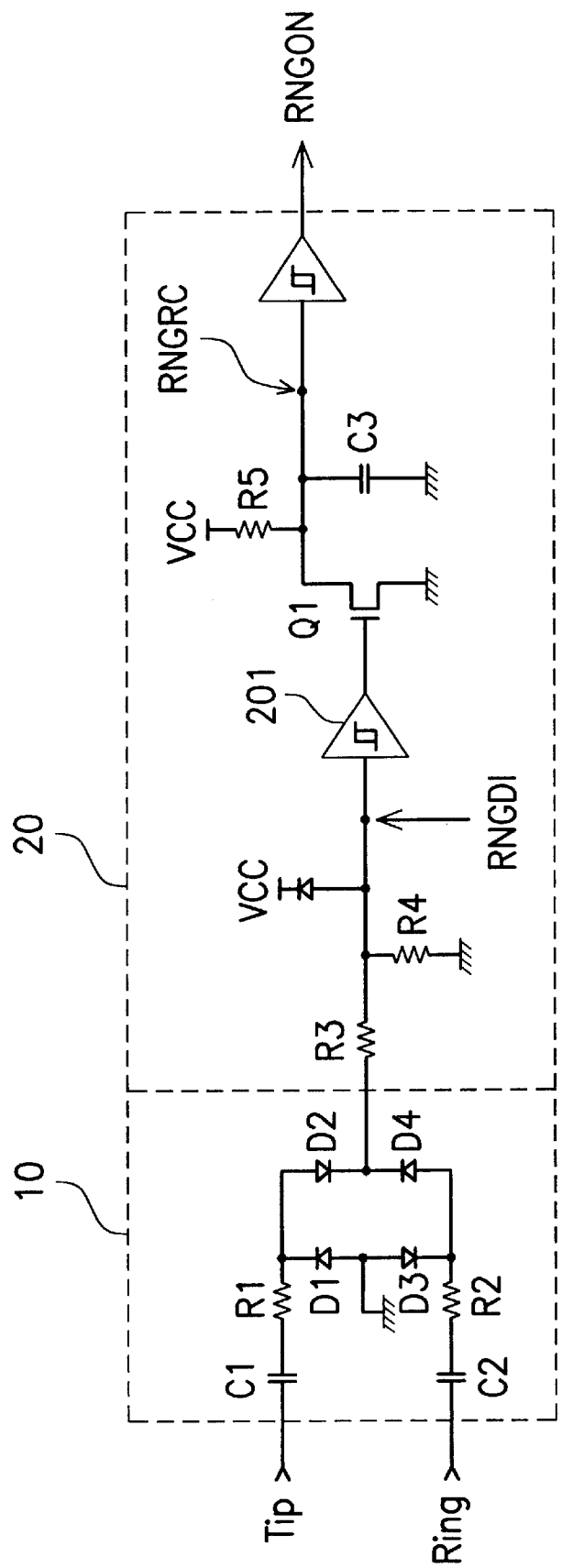
FIG. 2 is a diagram illustrating the detection circuit for detecting the line reversal signal and the ring signal in a conventional telephone set.
Figure 3:
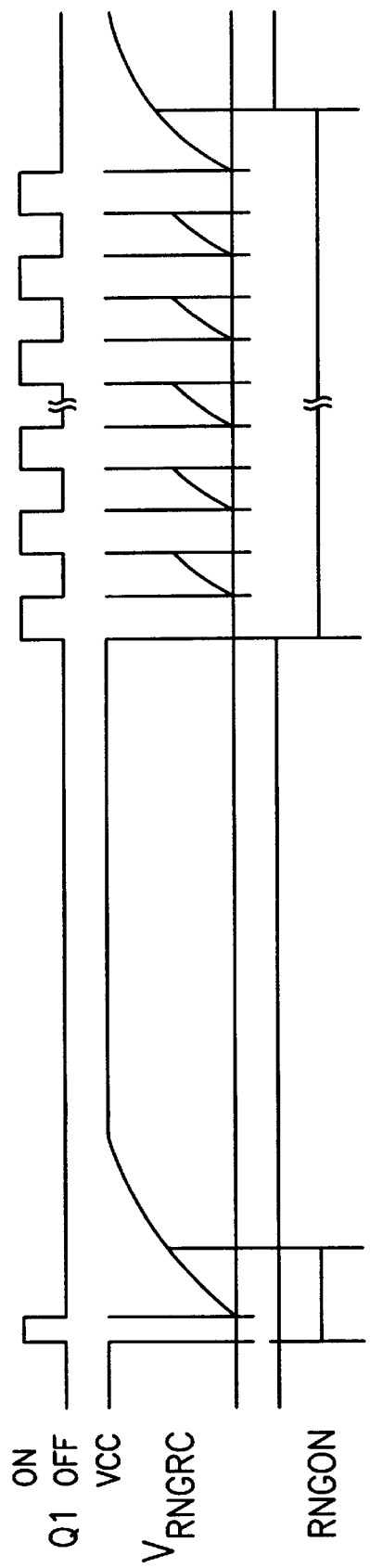
FIG. 3 is a timing diagram for the detecting circuit of FIG. 2.
Figure 4:
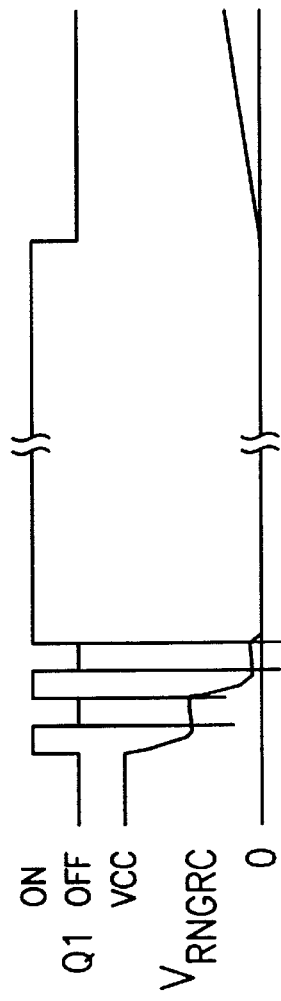
FIG. 4 is a diagram illustrating the bouncing phenomenon occurred when the exchanger activates a line reversal signal or a ring signal.
Figure 5:
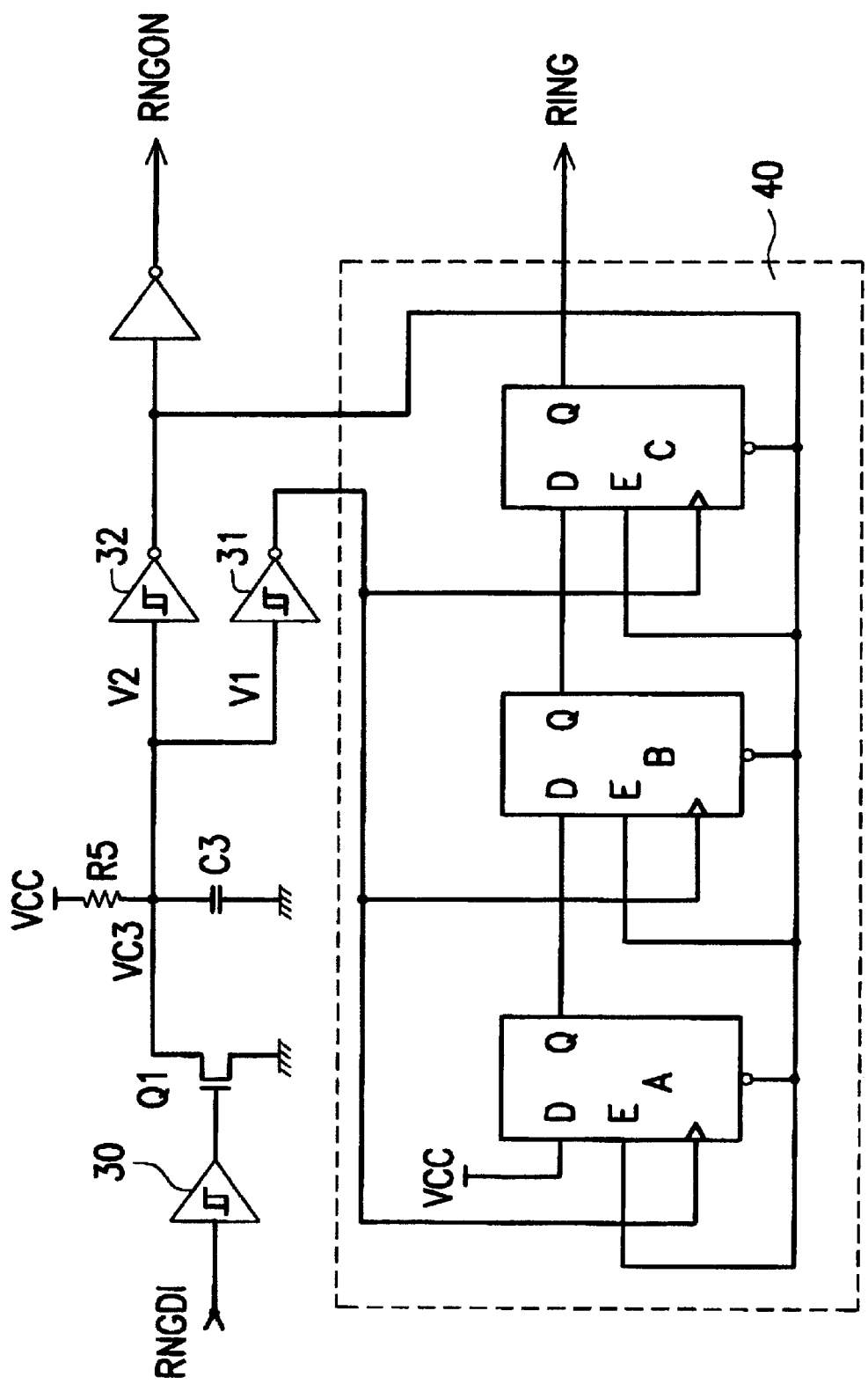
FIG. 5 is a diagram illustrating an embodiment of the telephone signal detecting circuit according to this invention.

FIG. 5 illustrates the circuit diagram for the telephone signal detecting circuit according to this invention, in which the circuit for inputting RNGDI signal is omitted to simplify the description. In the drawings, the flip-flops A, B, and C constitute a ripple detecting circuit 40, which can effectively absorb the bouncing pulse produced by activating the line reversal signal or ring signal, and can detect the ripple signal of the capacitor while ringing. This invention uses the Schmitt trigger 31 and 32 of two different trigger levels V1 and V2, wherein the trigger level V1<V2, and the trigger having the trigger level V2 is used to detect the envelope of the ring signal. The trigger having the trigger level V1 is used to detect the ripple signal produced by the charge/discharge of the capacitor while ringing. A signal, which can be used to identify the line reversal signal or the ring signal, can be obtained after the flip-flops are triggered.

Figure 6:
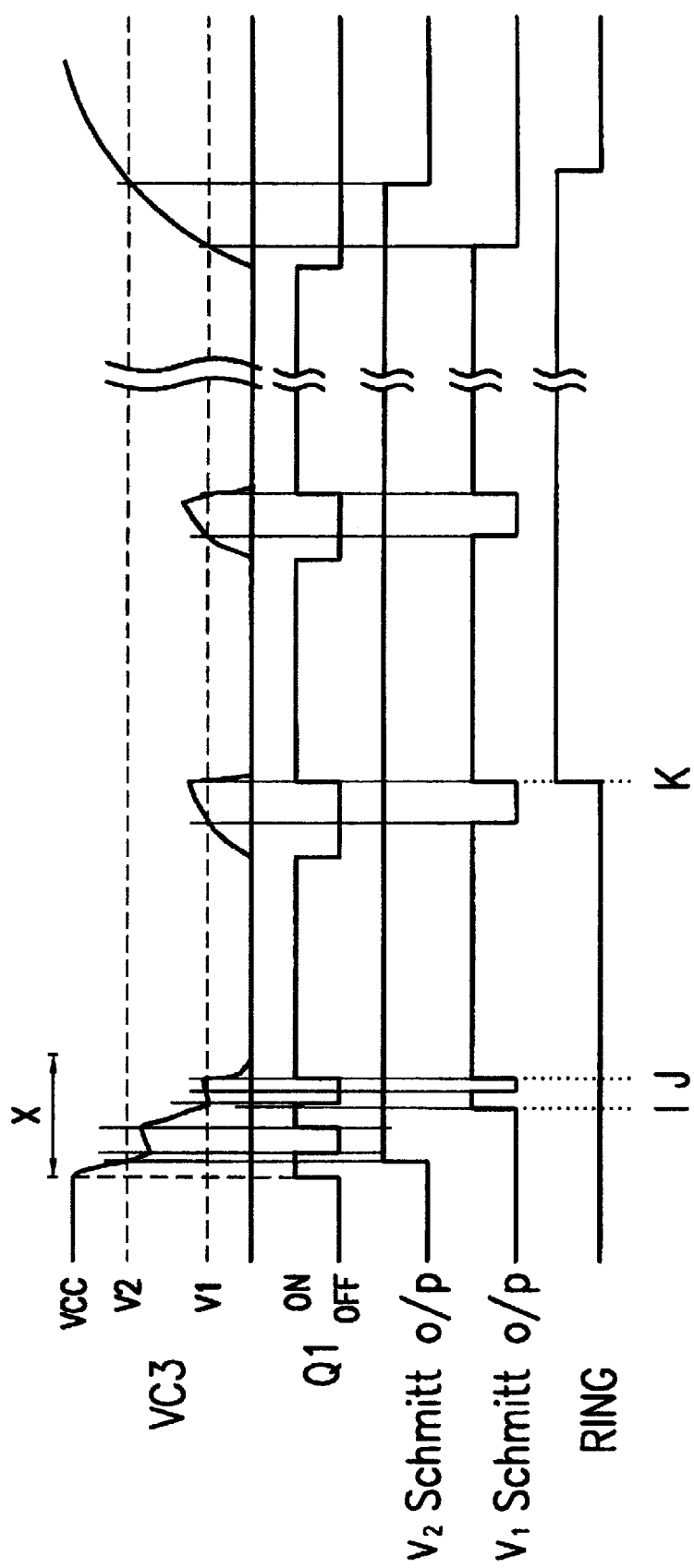
FIG. 6 is a timing diagram for the detecting circuit of FIG. 5.

FIG. 6 illustrates the timing diagram of the above circuit, wherein RNGDI represents input signal, Q1 is a transistor, V2 SCHMITT O/P indicates the output of the Schmitt trigger having the trigger level V2, V1 SCHMITT O/P indicates the output of the Schmitt trigger having the trigger level V1, RING represents the ringing signal. In FIG. 6, the bouncing at point I is absorbed by flip-flop A, the bouncing results in a small charge/discharge for the capacitor. If the voltage change of the charge/discharge is V1, the flip-flop is triggered at point J, then the flip-flop B absorbs the bouncing of the voltage. The ripple signal, which is produced when the ring signal causes the charge/discharge of the capacitor, is received by the flip-flop C at point K. This causes the ring signal RING to be high level. The input voltage RNGDI is changed along with the input voltage RNGDI after passing through the Schmitt trigger 30. The transistor Q1 opens to discharge the capacitor C3, or is closed so that the power supply VCC can charge the capacitor C3 through the resistor R5. The Schmitt's trigger 32 having the trigger level V2 is used to detect the envelope of the ring signal, i.e., the output of the Schmitt trigger 32 becomes high level when the input voltage is lower than V2. The Schmitt trigger 31 having the trigger level V1 is used to detect the ripple signal produced by the charge/discharge of capacitor while detecting the ringing.

In the circuit of FIG. 5, the flip-flops A, B, C of the ripple detecting circuit 40 can also be negative flip-flops to obtain an identical result. The ripple detecting circuit 40, which can be a counter having the functions of Enable and Clear, can determine a ring signal only if the counter can count the pulse signal output by the Schmitt trigger 31 having the trigger level V1 corresponding to the ripple signal produced by the charge/discharge of the capacitor by the ring signal.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A telephone signal detecting circuit for determining an input signal to be a line reversal signal or a ring signal, comprising:

a capacitor, controlled by a transistor, which is discharged when the transistor is closed, and is charged through a power supply when the transistor is opened;

a first trigger having a first trigger level, for outputting a ring detecting signal when a voltage of the capacitor is lower than the first trigger level during the charge/discharge of the capacitor;

a second trigger having a second trigger level, for outputting a pulse signal according to a ripple signal produced due to the charge/discharge of the capacitor when the voltage is lower than the second trigger level during the charge/discharge of the capacitor;

a ripple detecting circuit, which is driven by the first trigger and controlled by the second trigger, for filtering out bouncing noises, and outputting a ring signal after receiving the pulse signal, so that the input signal is determined to be a line reversal signal when the ring detecting signal is low level and no ripple signal outputs, otherwise the input signal is determined to be a ring signal if the ring detecting signal is high level and a ripple signal is output.

2. A circuit as claimed in claim 1 wherein the first trigger and the second trigger are Schmitt trigger.

3. A circuit as claimed in claim 1 wherein the ripple detecting circuit includes three flip-flops which are seriously connected.

4. A circuit as claimed in claim 1 wherein the ripple detecting circuit is a counter having enable and clearance functions.

5. A circuit as claimed in claim 1 wherein the first trigger level is larger than the second trigger level.

6. A circuit as claimed in claim 1 wherein the flip-flops of the ripple detecting circuit are flip-flop having enable input, in which the enable input of the flip-flops is high level, and the output and the input of the flip-flops are the same on the rising edge of the clock signal.

7. A telephone signal detecting circuit for determining an input signal to be a line reversal signal or a ring signal, comprising:

a rectifier circuit for receiving and rectifying an AC signal from a telephone line to obtain a signal; and a detecting circuit, which is used to determine whether an input signal is a line reversal signal or a ring signal, for latching an identifying signal when the detection of the line reversal signal or the ring signal is ending, and interrupting a microprocessor so that the microprocessor can identify whether the input signal is a line reversal signal or a ringing signal in accordance with the identifying signal.

8. A circuit as claimed in claim 7 wherein the detecting circuit includes Schmitt triggers having a first trigger level and a second trigger level, in which the trigger having the first trigger level outputs a ring detecting signal when the voltage of the capacitor is lower than the first level, and the trigger having the second trigger level outputs a pulse signal corresponding to the ripple signal when the voltage of the capacitor is lower than the second trigger level during the charge/discharge of the capacitor.

9. A circuit as claimed in claim 7 wherein the Schmitt triggers of the first and second trigger levels are respectively used to detect an envelope of the ring signal and a ripple signal produced due to the charge/discharge of the capacitor while detecting ringing.

10. A circuit as claimed in claim 7 wherein the detecting circuit includes a ripple detecting circuit including three flip-flops, which use the output of the Schmitt trigger detecting the envelope of the ring signal to be an enable and clearance inputs of the flip-flops, and use the output of the Schmitt trigger detecting the ripple signal to be a clock input of the flip-flops.

11. A circuit as claimed in claim 7 wherein the output of the three flip-flops equals to the input thereof when an enable input of the flip-flops is high level and on the rising edge of the clock input.

12. A circuit as claimed in claim 7 wherein the first trigger level is higher than the second trigger level.

* * * * *